March 19, 1968     E. R. WILLIAMS     3,373,716

SHOCK INDICATING DEVICE

Filed Dec. 29, 1965

*INVENTOR.*
EUGENE R. WILLIAMS
BY *Knox & Knox*

United States Patent Office 3,373,716
Patented Mar. 19, 1968

3,373,716
SHOCK INDICATING DEVICE
Eugene R. Williams, 4321 Niagara,
San Diego, Calif. 92107
Filed Dec. 29, 1965, Ser. No. 517,323
5 Claims. (Cl. 116—114)

ABSTRACT OF THE DISCLOSURE

Shock indicating means for use with easily damaged apparatus comprising an inertial body ordinarily spherical, supported in a cavity of a block of material, on fingers extending from all sides of the cavity, a shock causing the inertial body to crush and permanently compress certain of the fingers which can later be inspected and measured to determine the degree and direction of the shock. Multiple units with inertial bodies of different weights, used with a single item of damageable apparatus, can be employed to respond to different intensities of shock, and the fingers can be differently configured for varying the sensitivity.

---

The present invention relates to indicators and specifically to a shock indicating device.

During handling and transportation of delicate instruments and apparatus damage may occur due to shock or vibration, even with protective packaging. Signs of damage may not be evident in the packaging, although the contents could be damaged. It is common practice for many types of delicate apparatus to be thoroughly inspected after being handled, but this is an expensive process and must be very complete. If a record can be made of any shocks incurred during handling, the inspection is greatly simplified. Various devices have been used, such as strain gauges, recording accelerometers deformable links and the like, but these must be measured and rather elaborate procedures followed in order to determine shock. Such devices have limited ranges of sensitivity and often several must be used to ensure recording of shock intensity and direction accurately.

The primary object of this invention, therefore, is to provide a shock indicating device which is sensitive over a wide range of intensity and can easily be set up for various ranges to suit the requirements of any type of apparatus and packaging.

Another object of this invention is to provide a shock indicating device which also records the exact direction in which a shock occurs.

Another object of this invention is to provide a shock indicating device which will instantly show whether a damaging shock has occurred, without the need for dismantling or measurement of any kind.

A further object of this invention is to provide a shock indicating device which can be attached to, mounted in or actually incorporated into packaging of any type and is so simple and inexpensive as to be a throw-away item if necessary.

The construction and function of the device are illustrated in the drawing, in which.

Similar characters of reference indicate similar or identical elements and portions throughout the specification and throughout the views of the drawing.

Figure 1:
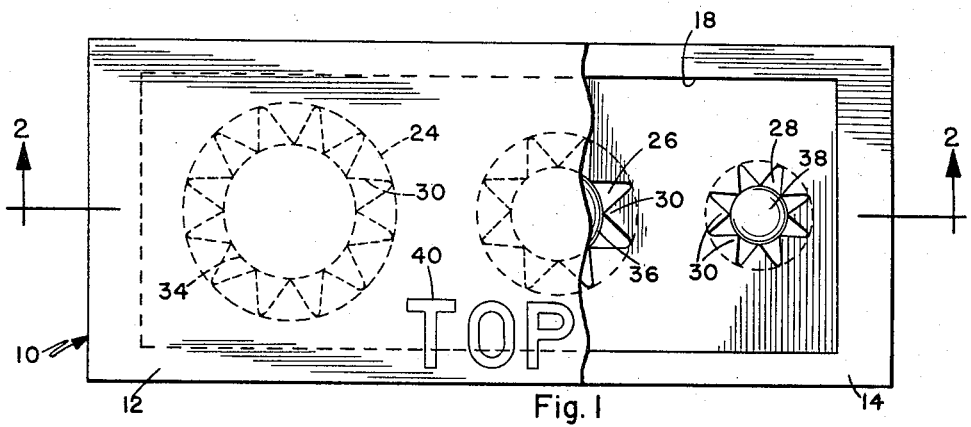
FIGURE 1 is a top plan view of the device, with a portion cut away.

The device in its simple form is a block of soft, permanently deformable material, such as foam plastic or the like. As illustrated the block is rectangular, although any reasonable shape could be used to suit specific packaging arrangements. The block 10 comprises a top portion 12 and a bottom portion 14, one having a plug 16 and the other a corresponding socket 18, so that the two portions interfit in aligned relation. Other types of keying may be used, such as ribs or tongues 20 fitting into similarly shaped grooves 22, as FIGURE 4 for example.

Within the block 10 are cavities of different sizes, each being basically spherical and extending equally into the top and bottom portions. Three such cavities 24, 26 and 28 are indicated, but other numbers and arrangements can be used. Each cavity has a plurality of inwardly projecting fingers 30 which hold an inertial mass stationary in the center of the cavity. The three differently sized masses or bodies 34, 36 and 38 are proportional to the respective cavities 24, 26 and 28 and are shown as being spherical, which will provide equal response in all directions. Other shapes may be used for specialized applications. The weight of each body is such that the fingers 30 will support the body securely during normal careful handling, the material and density of the bodies being chosen in accordance with the shock resistance or delicacy of the apparatus to which the device is to be attached. Fingers 30 are preferably conical or pyramidal to accommodate crushing in a uniform and readily identifiable manner.

Figure 2:
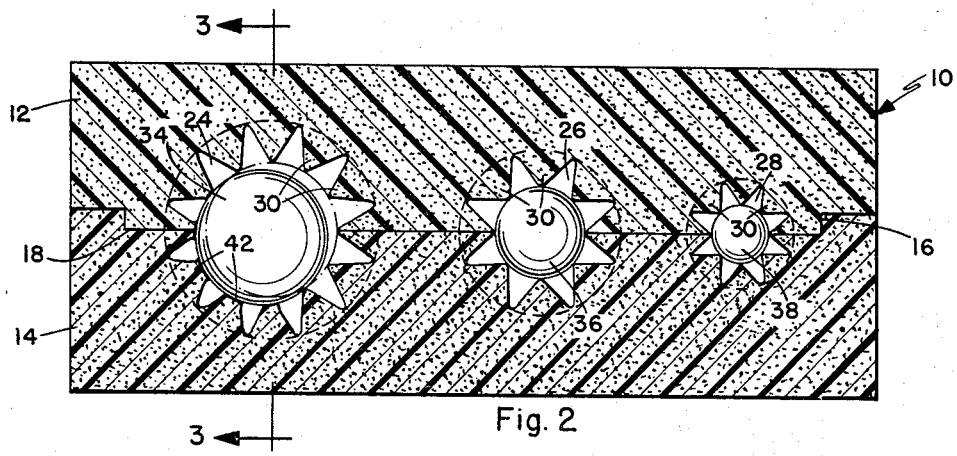
FIGURE 2 is a sectional view taken on line 2—2 of FIGURE 1.

To ensure proper analysis of any shock indicated by the device, the block is provided with suitable orientation markings 40, such as the word TOP on the top portion 12. The block is attached to, mounted on, or incorporated into the packaging of the apparatus to be protected in any suitable manner. Any shock incurred during handling, beyond a predetermined minimum shock which will not damage the apparatus, will cause one or more of the inertial bodies to be displaced and crush certain of the supporting fingers, as indicated at 42 in FIGURE 2.

Since each body is equally supported in all directions the specific fingers crushed will indicate the effective direction in which the shock was applied, the fingers having an inherent resistance to crushing and compression and the degree of crushing will indicate the shock intensity. A mild shock, beyond the predetermined minimum, will displace the largest body 34 due to its greater inertia. A more severe shock will displace the intermediate sized body 36, while a very severe shock will also displace the small body 38.

The combination of the three differently reacting bodies indicating three ranges of shock intensity, together with the degree of crushing of the body supporting fingers in each cavity, provides a very precise calibration of shock intensity. The unit is capable of measuring multiple shocks in different directions and of different intensities. For instance, if two shocks are registered in different directions the large body 34 will crush fingers 30 in more than one direction. If, as is more than likely, one shock is more intense than the other, then one or both of bodies 36 and 38 will record the direction of the more intense shock. A study of all three cavities will provide full information on both shocks.

With many types of apparatus it can readily be determined what intensity of shock will damage certain parts of the apparatus. A mild shock, registrable by the large body only, will affect only certain parts of the apparatus and inspection can be limited to those parts. After shipment or storage and before the apparatus is used the block can be gently rocked or shaken to determine if any of the bodies will move due to partial collapse of their support, the motion being readily felt. If no motion of the bodies is detected then the apparatus can be considered undamaged and need not be inspected. If the bodies are at all loose the block can be separated and the cavities examined to determine the shock characteristics, inspection of the apparatus then being carried out to the degree indicated. It will be evident that there will be a considerable saving in time and expense when the extent of necessary inspection is known.

Figure 3:
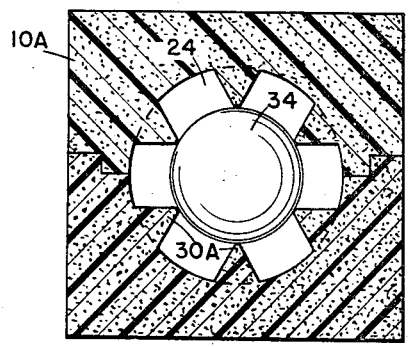
FIGURE 3 is a sectional view as taken on line 3—3 of FIGURE 2, but showing a more sensitive configuration.

For recording very low intensity shock the unit is easily modified, as in the block 10A in FIGURE 3, by reducing the number of fingers 30A to decrease the overall support for the body therein. It will be obvious that the cross sectional area of each finger could also be reduced to increase sensitivity. While the fingers are illustrated as substantially pointed with very small supporting area for the inertial body, it may be more practical to use very slightly flattened tips to prevent crushing by normal careful handling.

Figure 4:
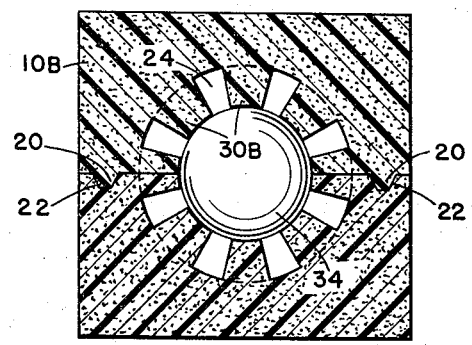
FIGURE 4 is a sectional view similar to FIGURE 3, but showing a less sensitive configuration.

To decrease sensitivity, the number of fingers could be increased or the fingers could be truncated, as at 30B in block 10B of FIGURE 4. The support area for the inertial body is thus increased and a greater shock is necessary to crush the supports. In either instance the inertial body is equally supported in all directions, the different configurations being shown to indicate that the sensitivity is variable over a very wide range without altering the basic design or concept of the unit.

Figure 5:
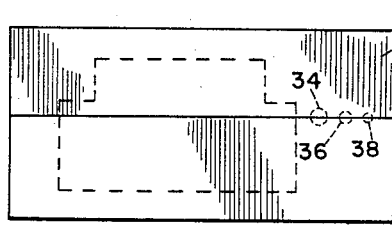
FIGURE 5 is a reduced scale view of a typical package incorporating the device in the packaging material itself.

In some instances where the apparatus is itself packed in plastic foam, the inertial bodies and their respective cavities with supporting fingers may be incorporated directly into the packing 44, as in FIGURE 5.

The use of inexpensive foam plastic as the recording medium makes it feasible to dispose of used block elements, the inertial bodies themselves being re-usable if required.

It is understood that minor variation from the form of the invention disclosed herein may be made without departure from the spirit and scope of the invention, and that the specification and drawing are to be considered as merely illustrative rather than limiting.

I claim:

1. Shock indicating means for use with easily damageable apparatus, comprising:

a generally block-like member having at least one cavity therein, said cavity having a plurality of inwardly projecting finger elements of readily crushable, permanently deformable material unitarily formed with said block-like member;

and an inertial body in said cavity supported in all directions by said finger elements, whereby shock imparted to the (structure) apparatus will cause said inertial body to crush and compress certain of said finger elements in a direction and to a degree corresponding to the direction and intensity of the shock, the crushed and compressed fingers being measurable to indicate said direction and intensity.

2. Shock indicating means according to claim 1, wherein said block-like member has a plurality of cavities of different sizes, each cavity having a plurality of said inwardly projecting finger elements;

and inertial bodies of different masses contained one in each of said cavities to respond to different ranges of shock intensity.

3. Shock indicating means according to claim 1, wherein said block-like element is composed of interfitting portions, with said cavities divided and extending into the conjoining portions.

4. Shock indicating means according to claim 1, wherein said finger elements are substantially pyramidal with tip portions of very small area contacting the inertial body and sensitive to shocks of small as well as great intensity.

5. Shock indicating means according to claim 1, wherein said finger elements are of substantially pyramidal truncated form, having flattened inner end portions contacting the inertial body and sensitive only to shocks of great intensity.

References Cited

UNITED STATES PATENTS

| | | | |
|---|---|---|---|
| 2,674,221 | 4/1954 | Tinsley | 116—114 |
| 2,976,732 | 3/1961 | Hautly | 73—492 |
| 3,021,813 | 2/1962 | Rips | 73—12 XR |
| 3,101,069 | 8/1963 | Reich et al. | 116—114 |
| 3,117,455 | 1/1964 | Shepherd | 73—492 |
| 3,136,293 | 6/1964 | Schmitt | 116—114 |
| 3,267,739 | 8/1966 | Epps et al. | 73—492 |
| 3,312,188 | 4/1967 | Gode et al. | 116—114 |

LOUIS J. CAPOZI, *Primary Examiner.*